(No Model.)
L. WHITTY.
AGRICULTURAL IMPLEMENT.
No. 378,347. Patented Feb. 21, 1888.
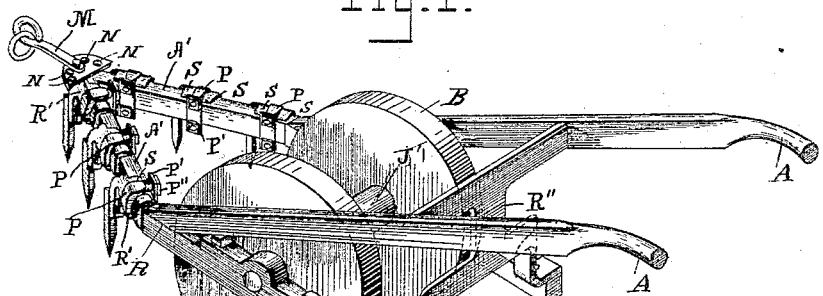
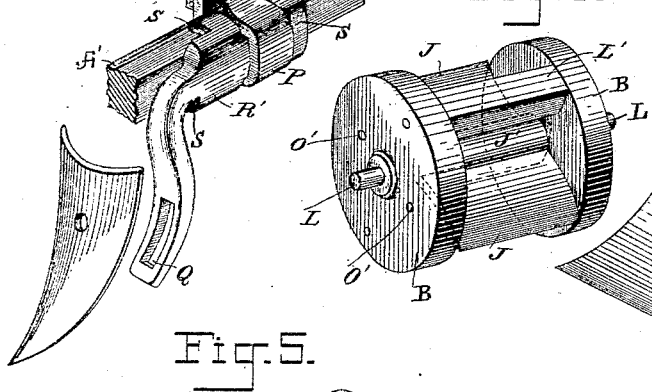
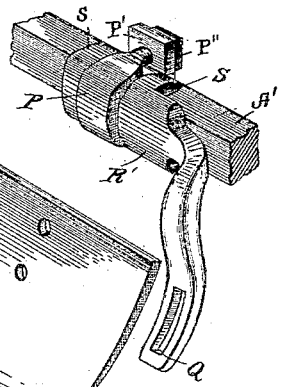
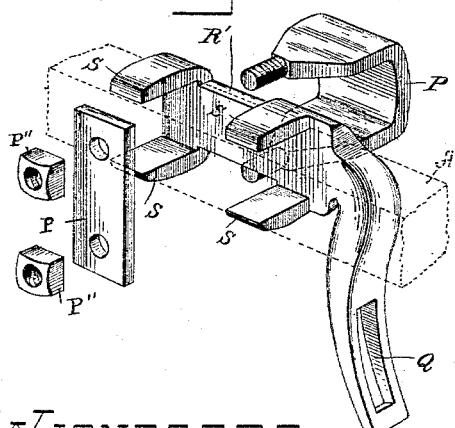
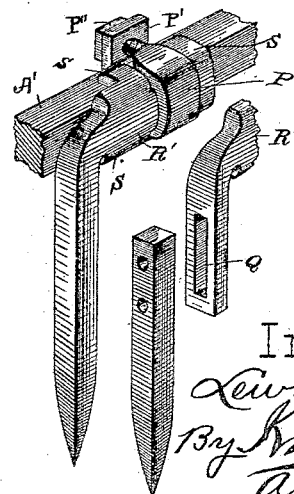
WITNESSES
John F. Nelson
F. A. Hopkins
INVENTOR
Lewis Whitty
By Knight Bros
Attorneys

UNITED STATES PATENT OFFICE.

LEWIS WHITTY, OF POLLOCKSVILLE, NORTH CAROLINA.

AGRICULTURAL IMPLEMENT.

SPECIFICATION forming part of Letters Patent No. 378,347, dated February 21, 1888.

Application filed July 12, 1887. Serial No. 244,096. (No model.)

*To all whom it may concern:*

Be it known that I, LEWIS WHITTY, a citizen of the United States, residing at Pollocksville, in the county of Jones and State of North Carolina, have invented certain new and useful Improvements in Combined Agricultural Implements, of which the following is a specification.

This invention relates to a device which may be employed either as a harrow, a cultivator, a stalk-cutter, or a scraper and weeder, the various parts being so constructed as to be interchangeable, as will be described.

The object of the invention is to produce a cheap construction combining various useful forms of farm implements, whereby economy can be obtained and storage-space saved.

To these ends my invention consists of a frame provided with handles for the operator, and having means for attaching and detaching the various forms of utensils, as will be described.

Referring to the accompanying drawings, which form a part of this specification, Figure 1 represents the implement having the harrow-teeth attached thereto. Fig. 2 represents one of the cultivator-blades detached, showing the means of attachment. Fig. 3 is a similar view of the scraper and weeder. Fig. 4 is a perspective view of the stalk-cutter. Fig. 5 is an enlarged detail view of the shank detached, and also showing the means of attachment to the frame. Fig. 6 represents two forms of harrow-teeth, one being formed integral with and the other separate from the attaching device.

In the drawings, A represents the handles of the implement, which are attached to the frame or blade holder A' at points R and supported on the frame by plate R''. B represents the wheels of the implement, which are journaled to the blade holder or frame at O. The stalk-cutter can also be journaled to the blade-holder at O by means of the spindles L, which project out from each side of the cutter. The stalk-cutter is also provided with bars L', which run from side to side of it and are bolted to the end rollers, for the purpose of giving the same rigidity and steadying it when it is rolling over rough ground. A knife, J, is placed in opposite sides of the stalk-cutter, which is provided with a sleeve, J', having longitudinal slots in which the backs of said knives are inserted for preventing rotary movement of the latter, while other displacement is prevented by bolts O'.

When it is desired to cultivate anything, the harrow-points are taken out by removing the clips P, which are provided to fasten them on with, having plates P' and securing-nuts P''. Then they are taken out and the cultivator-blades inserted and the clips replaced, when they are ready for use. The same operation is performed when it is desired to use the scraper and weeder; but when it is desired to use the stalk-cutter the wheels B and the harrow-points, cultivator-blades, or whatever happens at the time to be in the blade-holder, are removed and the stalk-cutter's spindles are placed in the bearings at O, and it is then ready for use.

The blade-holder is provided with an adjustable or movable clevis-hook, M, which allows the cultivator to be made to operate at any angle that is wished by taking out the bolt which fastens it to the blade-holder and inserting it in any of the holes or openings N N N, according to the angle at which it is desired to have it work.

The shank to which the blade is secured is provided at its lower end with a slot, Q, through which the bolt passes for securing the blade, as usual; but at the upper end of this shank is a piece, R', formed at right angles thereto, and preferably integral therewith. This piece has lugs or flanges S at top and bottom on each side of the clip for receiving the frame or blade holder, and is securely clamped to said frame by a clip, P.

It is of course not necessary to make the harrow-teeth and piece R' separately unless it should be for the purpose of adjusting the length or for replacing the teeth without necessitating the renewal of the attaching device.

It will be understood, of course, that the shank is made to conform to the shape of the particular blade or tooth which is to be attached thereto.

The frame or blade holder may be constructed of either wood or metal, as it will be seen that the novel means of attaching the blades to the frame is applicable in either case.

It will further be noted that the said attachment does not require any perforations or indentations in the frame to co-operate with it in making fast the shank of the blade. Thus the great advantage of being able to place the blades at any desired point on the frame is gained.

Having thus described my invention, what I claim as new therein, and desire to secure by Letters Patent, is—

1. The combination of the frame, the shanks formed with piece R' and lugs S at top and bottom at each end of the piece, and clips P between the lugs, having a plate, P', and nuts P'', substantially as described.

2. The shank formed with slot Q, piece R', and top and bottom lugs S on each end of the piece, and provided with clip P, plate P', and nuts P'', substantially as described.

3. The stalk-cutter comprising rollers B, bars L', spindles L, slotted sleeve J', knives J, and bolts O', substantially as described.

4. The combination of the frame A', handles A, plate R'', rollers B, sleeve J', journals O, harrow-points, and adjustable clevis-hook, substantially as described.

LEWIS WHITTY.

Witnesses:
H. A. WHITE,
JOHN R. OLIVER.